Nov. 4, 1969      A. V. LOUGHREN      3,476,874

CONTROLLED INK-JET COPY-REPRODUCING APPARATUS

Filed Nov. 8, 1966      10 Sheets-Sheet 1

Nov. 4, 1969          A. V. LOUGHREN          3,476,874

CONTROLLED INK-JET COPY-REPRODUCING APPARATUS

Filed Nov. 8, 1966          10 Sheets-Sheet 8

United States Patent Office
3,476,874
Patented Nov. 4, 1969

3,476,874
CONTROLLED INK-JET COPY-REPRODUCING APPARATUS
Arthur V. Loughren, 22 Broadlawn Ave., Great Neck, N.Y. 11024
Filed Nov. 8, 1966, Ser. No. 592,909
Int. Cl. H04n 5/76
U.S. Cl. 178—6.6      17 Claims

ABSTRACT OF THE DISCLOSURE

A controlled ink-jet recorder for reproducing a copy on a record sheet. A jet of ink is broken into droplets at a substantially constant frequency by a magnetostrictive arm connected to the ink nozzle. The video input signal is sampled. The magnitude of the sample is used to control size of the ink droplets so that a continuous tone reproduction is possible.

---

This invention relates to controlled ink-jet copy-reproducing apparatus and, while it is of general application, it is particularly adapted for making color reproductions from a colored subject copy, for example, a positive or negative color print or transparency. It is, however, applicable also to making monochrome reproductions.

In applicant's copending application Ser. No. 500,947, filed Oct. 22, 1965, now Patent 3,404,221, there is described and claimed a controlled ink-jet copy-reproducing apparatus for making color reproductions from colored subject copy which obviates many of the limitations and disadvantages of prior apparatus and methods for reproducing multicolor subject copy. The present invention represents an extension of, and improvement upon, the controlled ink-jet copy-reproducing apparatus described and claimed in aforesaid copending application and is directed particularly to a simplification of the apparatus.

It is an object of the present invention, therefore, to provide a new and improved controlled ink-jet copy-reproducing apparatus of the general type described in aforesaid copending application, requiring only a single ink-jet nozzle for either monochrome or color reproduction.

It is another object of the invention to provide a new and improved controlled ink-jet copy-reproducing apparatus of the general type described in aforesaid copending application which is effective to make continuous-tone reproductions, either in monochrome or color.

In accordance with the invention, there is provided in a controlled ink-jet apparatus for reproducing a subject copy on a record sheet including input means for supplying at least one synchronized video signal representative of the serial information content of a subject copy to be reproduced and a head for scanning a record sheet in synchronism with said video signal, controllable ink-jet apparatus adapted for mounting on the scanning head comprising an ink-jet nozzle, means for acting upon a jet from the nozzle to break it up into droplets at a substantially constant average frequency, means for periodically sampling the input video signal in synchronism with the average frequency of the jet-breaking means, and means responsive to the magnitude of each signal sample for controlling the instantaneous timing of the jet-breaking means to determine the initiation of a succeeding droplet.

For a better understanding of the present invention, together with other and further objects thereof, reference is had to the following description, taken in connection with the accompanying drawings, while its scope will be pointed out in the appended claims.

Referring now to the drawings:

FIG. 15 is a schematic representation of an electrical system for actuating the ink-distributing apparatus of FIG. 14, while

Figure 1:
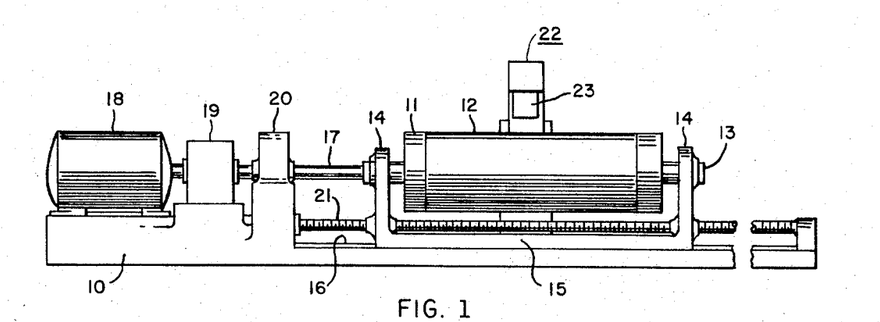
FIG. 1 is an outline view, in elevation, showing the general physical layout of the several components of apparatus embodying an example of the invention.
Figure 2:
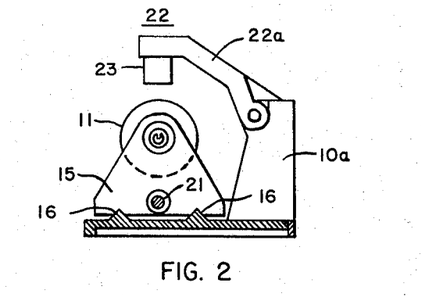
FIG. 2 is an outline end view of the apparatus of FIG. 1.

Referring now more particularly to FIGS. 1 and 2 of the drawings, there is represented a controlled ink-jet apparatus for reproducing a monochrome or multicolor subject copy on a record sheet comprising a base or frame 10, on which is mounted a rotatable support such as a drum 11 for a record sheet 12, which may be of paper or other suitable material. The drum 11 is mounted on a shaft 13 journalled in upstanding arms 14, 14 of a carriage 15 slidable on a pair of ways 16 similar to those widely used in machine tools. The shaft 13 is hollow and is actuated by a drive shaft 17 which extends into the hollow shaft 13 for a considerable distance and is splined thereto to permit driving of the shaft 13 while the carriage 15 travels along the ways 16.

The drive shaft 17 is driven by a motor 18, preferably a synchronous motor, which also drives a delay assembly 19, described hereinafter, and a gear train 20. The gear train 20 drives a lead screw 21, the gear ratio being such that, in one revolution of the shaft 17 and the drum 11, the lead screw 21 will advance the carriage 15 by exactly the line-to-line displacement of the image reproduced on the record sheet 12.

The motor 18 is supplied from a suitable power supply circuit of a frequency which produces an acceptable resolution along the length of a scanning line on the record sheet 12, as described in aforesaid copending application. Associated with the drum 11 is a stationary head assembly 22 for scanning the record sheet 12 on the drum 11 in synchronism with a video signal or signals, also as described in aforesaid copending application. This scanning head 22 includes a frame member 22a which carries an ink-jet head 23, described hereinafter, and is pivotallly supported on a bracket 10a upstanding from the frame 10 so that the ink-jet head deposits ink on the record sheet 12.

Figure 3:
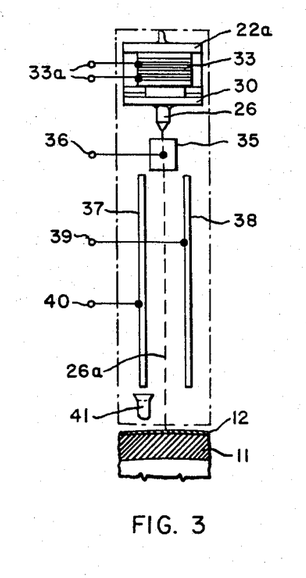
FIG. 3 is a detailed side elevation of the ink-jet head of the apparatus of FIGS. 1 and 2.
Figure 4:
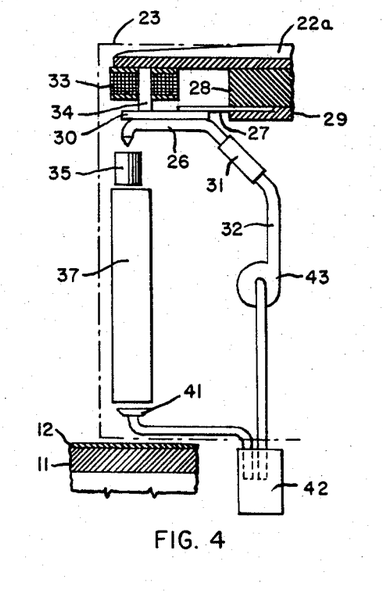
FIG. 4 is a detailed end view of the ink-jet head of FIG. 3.

The ink-jet head 23 is shown in detail in FIGS. 3 and 4. This head comprises an ink jet or nozzle 26, the tip of which is directed to the record sheet 12 on the drum 11. The frame 22a carries a flexible hinge member 27 spaced therefrom by a spacer 28 and secured by clamping plate 29. The flexible hinge 27 is secured to a supporting plate 30 on which the ink jet 26 is mounted in any suitable fashion. The ink jet 26 is provided with a flexible section, such as the section 31, which connects to a rigid ink supply pipe such as the pipe 32. The ink-jet head assembly 23 comprising the supporting plate 30 and the ink jet 26 includes means for oscillating the ink jet to break up the ink discharged therefrom into discrete droplets. Specifically, the plate 30 is oscillated vertically at a high average frequency, for example 10,000 to 100,000 c.p.s., by means of an exciting winding 33 energized from supply terminals 33a and cooperating with a magnetostrictive armature element 34 secured to the supporting plate 30 and to the frame 22a.

Associated with the ink jet 26 is a means for developing an electric field encompassing the trajectory of the ink jet therefrom to cause the same to deposit ink on the appropriate spot of the record sheet 12 for each bit of signal information supplied thereto. This means may be in the form of a conductive charging cylinder 35 through which the jet of ink from the nozzle 26 passes. It is important that the cylinder 35 encloses the ink jet at the point where the ink stream breaks up into droplets. The cylinder 35 is excited with video signals from input terminal 36, as described hereinafter. The ink-jet head 23 also comprises a pair of vertical deflection plates 37, 38 capable of developing a deflection field acting upon the ink droplets from the nozzle 26. The deflection plates 37, 38 are connected to unidirectional supply circuit terminals 39, 40.

The arrangement of the ink nozzle 26, the charging cylinder 35, and the deflection plates 37, 38 is such that normally, that is, in the absence of video-signal components when no electric charge is imparted to the ink droplets as they pass through the cylinder 35, the ink jet proceeds directly to the record sheet 12 as represented by the jet 26a. However, when an electric charge is impressed upon the ink jet by the cylinder 35, the jet is deflected, as to a drain 41 from which it is returned to an ink reservoir 42 by gravity, as shown, or by a pump if required. As shown in FIGS. 3 and 4, the drain 41 is displaced peripherally with respect to the undeflected trajectory 26a of the ink droplets (FIG. 3). Ink may be supplied to the nozzle 26 from the reservoir 42 by a pump 43 providing a high-velocity jet, for example 100 to 1000 inches per second.

The apparatus so far described is essentially the same as that described in aforesaid copending application Ser. No. 500,947, now Patent 3,404,221, except for the discharge characteristics of the ink jet or jets. However, in this invention, the ink-jet head is operated in a manner basically different from that in aforesaid copending application by apparatus to be described. It is believed that an understanding of the invention will be aided by a brief reference to the basic principles of operation of the present invention differing from those of the apparatus of aforesaid copending application. The apparatus disclosed in the latter application involved a sinusoidal oscillation of the ink jets or nozzles effective periodically to break up the ink jet issuing from each nozzle at regular intervals into a series of droplets of uniform size and optical characteristics and the use of a plurality of such ink jets or nozzles in each head having different ink-discharge characteristics, or a plurality of such ink-jet heads, one for each color of a multicolor apparatus, or both. Such a system reproduces copy with a plurality of discrete tonal values in either monochrome or color, as described in aforesaid copending application. In the apparatus of the present invention, the jet of ink issuing from the single nozzle 26 is broken up into droplets at a constant average frequency but with an instantaneous timing varying from droplet-to-droplet such as to control continuously the size or optical characteristics of each droplet and thereby produce a copy having continuous tonal variations over the range of the apparatus, for example, from a droplet size of substantially zero up to a size corresponding to an entire picture element.

Figure 5:
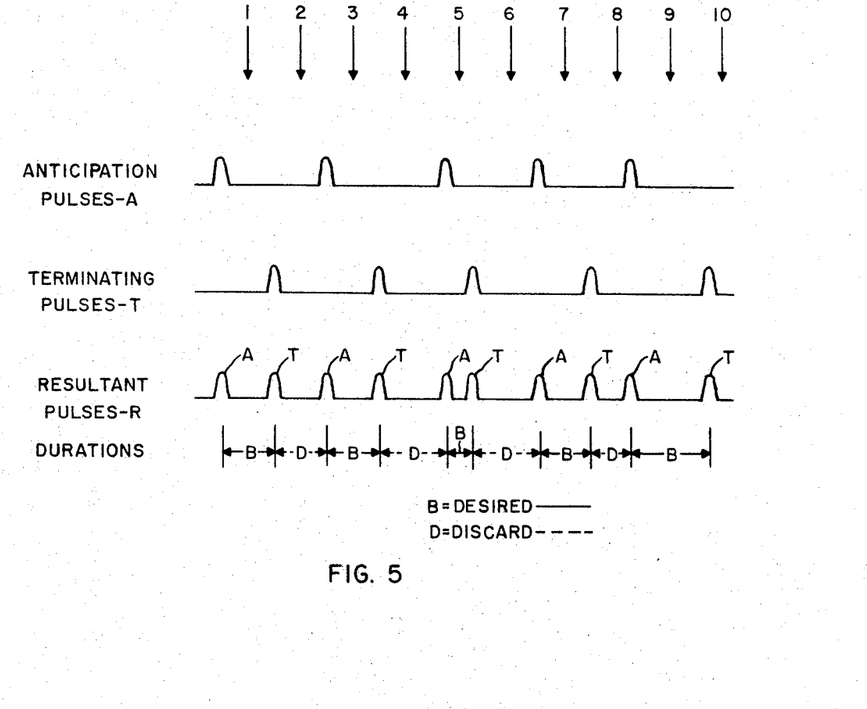
FIG. 5 comprises a series of wave forms to aid in explaining the invention.

Referring now to FIG. 5, it may be assumed that it is desired to have desired ink droplets occur at uniformly spaced time intervals represented by the odd-numbered arrows 1 to 9. The droplets which are to be discarded occur at equal spacings substantially half-way between the locations of the desired droplets and are represented by the even-numbered arrows 2 to 10. If there are applied to the winding 33 anticipation pulses A shortly before the timing of each desired droplet and terminating pulses T occurring subsequent to the times of the desired droplets, then the resultant pulses R will be as shown in FIG. 5 and the nozzle 26 will be shock-excited upon the occurrence of each of the resultant pulses R to initiate the formation of an ink droplet. The duration of ink flow from the nozzle 26 corresponding to desired pulses and to discarded pulses are then as shown by the solid lines B and dotted lines D.

It is noted that the first anticipating pulse A precedes the center of the first desired droplet B by one-half of the duration of the desired droplet. Similarly, the first terminating pulse T follows the center of the desired droplet by the same interval. However, as the timing of the anticipation pulses A and terminating pulses T is varied, the relative durations of the desired pulses B and the discard pulses D are varied, as shown. As a consequence, the fraction of the total cycle of ink flow from the nozzle 26 to reach the record sheet 12 is varied from cycle-to-cycle and, by continuously varying the timing of these two series of pulses, the tone value of the resultant reproduced copy can be varied continuously over the entire tonal range of the equipment. In fact, the terminating pulses T can be advanced and the anticipating pulses A retarded to the point where they partially or wholly overlap, in which case one series of ink droplets disappears and the total volume of ink flow is contained wholly in the other series of droplets.

Figure 6:
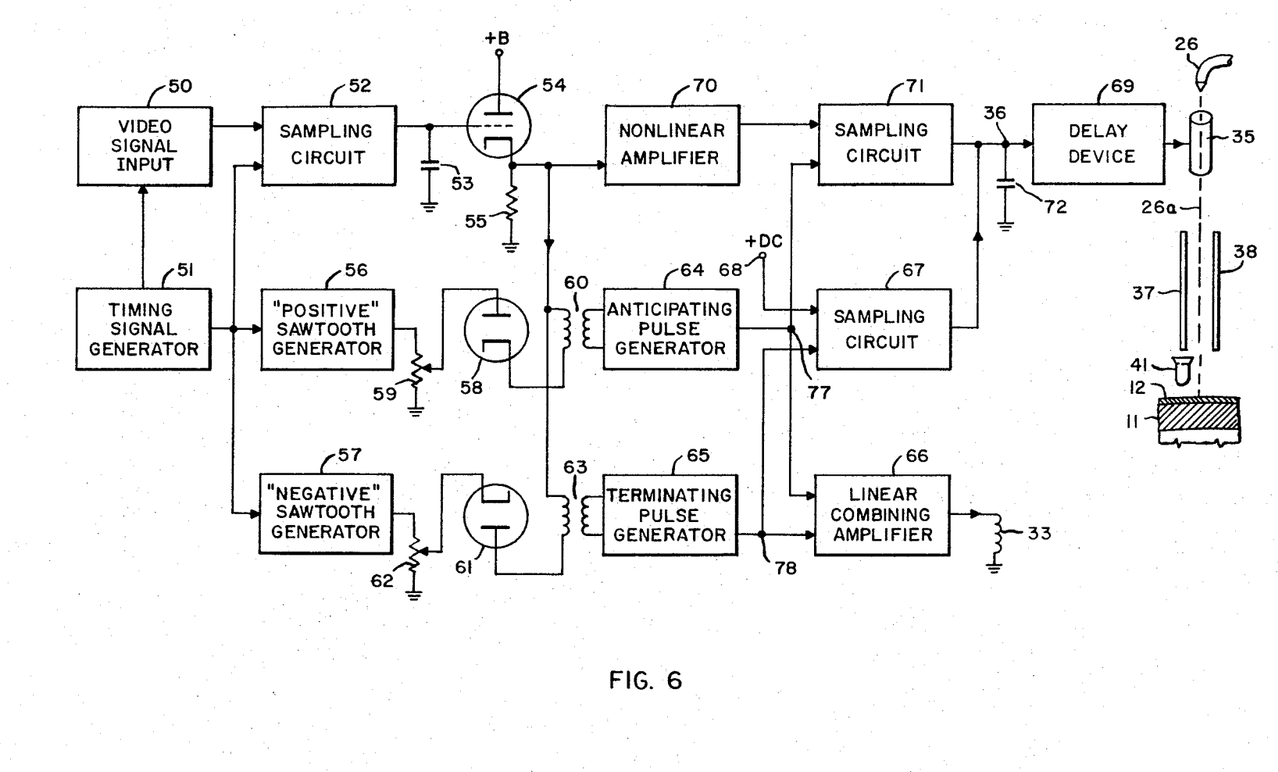
FIG. 6 is a schematic functional diagram of a complete electrical system for controlling the ink-jet copy-reproducing apparatus of FIG. 1.

Referring now to FIG. 6, there is represented schematically a functional single-line diagram of a complete electrical system for controlling the ink-jet copy-reproducing apparatus described. This system includes an input device 50 for supplying a synchronized video signal representative of the serial information content of a subject copy to be reproduced, for example the copy 12 on the drum 11. The unit 50 may be of any conventional type or it may be of the type illustrated in FIG. 5 and including the components 50–71, inclusive, of aforesaid copending application. This input signal is in synchronism with the scanning of the copy sheet 12 by the head 23.

The system of FIG. 6 also comprises means for acting upon a jet from the nozzle 26 to break it up into drop-lets at a constant average frequency, such means comprising the actuating winding 33 and the electrical system to be described. The system of FIG. 6 further comprises means for periodically sampling the input video signal in synchronism with the average frequency of the jet-breaking means, specifically a timing signal generator 51 controlling a sampling circuit 52 to which is also applied the video signal from the unit 50. The sampling circuit 52 may be of any suitable type, for example that illustrated in FIG. 6 of aforesaid copending application. The samples of video signal at the output of unit 52 are impressed upon and stored by a capacitor 53 connected to the input circuit of a signal repeater such as a cathode-follower triode 54 having a cathode-load resistor 55.

The system of FIG. 6 further comprises means responsive to the magnitude of each signal sample for controlling the instantaneous timing of the jet-breaking means to determine the initiation and duration of a succeeding ink droplet. This means may include a pair of generators 56 and 57 for developing sawtooth potentials of opposite polarity and means comparing the instantaneous potential of the sampling unit 52 with that of one of the generators, for example the "positive" generator 56. This comparing means may comprise a unidirectionally conductive device such as a diode 58 coupled by way of an adjustable voltage-divider resistor 59 to the output of generator 56 and to the output or load resistor 55 of the signal sample repeater 54. The voltage-divider 59 is provided to adjust the amplitude of the positive sawtooth potential to the range of input video signals and to control the timing range of the anticipatory pulses A and, thus, the tonal range of the reproduced copy. A pulse-generating device such as a current transformer 60 is connected in series with the diode 58 and is effective to generate a pulse when the two potentials have substantially the same values so that the diode 58 begins to conduct current.

The control system of FIG. 6 further comprises means for comparing the instantaneous potential of the sampling unit 52 appearing across the resistor 55 and that of the other sawtooth generator 57 and effective to generate a terminating pulse T when the two potentials have substantially the same values. This means is similar to that for generating the anticipating pulses A and comprises a diode 61 connected to the output of generator 57 through an adjustable voltage-divider 62 and to the resistor 55 through a current transformer 63. The secondary windings of transformers 60 and 63 are connected to an anticipating pulse generator 64 and a terminating pulse generator 65, respectively, which may be of any suitable type such as a monostable multivibrator. The system of FIG. 6 further comprises means for initiating the desired droplets from anticipatory pulses A and succeeding droplets from the terminating pulses T. This means may be in the form of a linear combining amplifier 66 to which the pulses from the generators 64 and 65 are applied and having an output circuit coupled to the actuating winding 33 of ink jet 26.

As descrbed above, the ink jet from the nozzle 26 passes through the electric deflecting field developed by the plates 37, 38 and, under the control of the charging cylinder 35, flows either to the record sheet 12 or to the drain 41. To effect desired control, the system of FIG. 6 includes a sampling circuit 67 triggered by the terminating pulses T from generator 65 and thus actuated at the same frequency as the sampling circuit 52. The sampling circuit 67, under control of the terminating pulses T from generator 65, develops from a source 68 a high-potential rectangular wave, the high-potential portions thereof intermittently supplying a suitable bias potential to the charging cylinder 35 through a delay device 69, to be described, to deflect the undesired ink droplets to the drain 41, while the zero-potential portions thereof permit the drops from the nozzle 26 to proceed directly to the record sheet 12 on the drum 11. Potential applied to the cylinder 35 from the sampling circuit 67 is held by a capacitor 72 so that an appropriate potential is applied to the charging cylinder 35 during the entire transit time of each droplet and the high potential from source 68 is adequate to deflect the undesired droplets to the drain 41, irrespective of variations in the size of the droplets and, therefore, variations in their transit time from the nozzle 26 to the record sheet 12.

Since, as indicated in FIG. 5, a finite time interval lapses between an anticipating pulse A or a terminating pulse T and the entry of a discrete droplet into the charging cylinder 35, a delay device 69 of any suitable type is included in the connection to the charging cylinder 35 to compensate for this relatively fixed transit time of the droplets from the nozzle 26 into the charging cylinder 35.

The time of transit of a droplet from the nozzle 26 to the record sheet 12 will vary inversely with the size of the droplet. As a consequence, desired droplets of different sizes will not hit the continuously moving record sheet at the same spot, as desired, but will tend to be distributed over a small distance in the direction of travel of the record sheet. To compensate for this effect, the system of FIG. 6 comprises means responsive to the sampled video signal for exciting the electric field producing cylinder 35 including a nonlinear amplifier 70 proportioned to compensate for variations of the transit time of the ink droplets from the nozzle 26 to the record sheet 12. The amplifier 70 is coupled to the output resistor 55 of repeater 54 and its output is, in turn, coupled to a sampling circuit 71 controlled or triggered by anticipating pulses A from the generator 64 so that the video signal sample is effective during the passage of the desired droplet through the cylinder 35. The output of sampling circuit 71 is applied to the charging cylinder 35 through the delay device 69 to compensate for variations of the transit time of the ink droplets from the nozzle 26 to the record sheet 12.

The particular nonlinear characteristic of the amplifier 70 depends on a number of factors including the velocity of the ink jet from the nozzle 26, the distance from the nozzle to the record sheet 12, the linear velocity of the record sheet 12 transverse to the nozzle 26, the pressure of the air through which the droplet travels, etc. Thus, for any given electric field developed by the cylinder 35, the charge on a droplet is directly proportional to the droplet size. However, the masses of the droplets vary as the cube of the linear dimension so that the electrostatic deflection of the droplets varies approximately as the inverse square of the size of the droplets. The particular nonlinear function of amplifier 70 is proportioned, inter alia, to compensate for this variation in the electrostatic deflection of the ink droplets with their size. It can be most readily determined experimentally to conform to the requirements of the particular apparatus. The nonlinear amplifier 70 may be of any suitable type in which there is an approximately continuous change in amplifier gain with signal level, for example as illustrated and described in the gamma correction circuits found in "Principles of Color Television," by McIlwain & Dean, published by John Wiley & Sons, 1956, pages 217–227.

Figure 7:
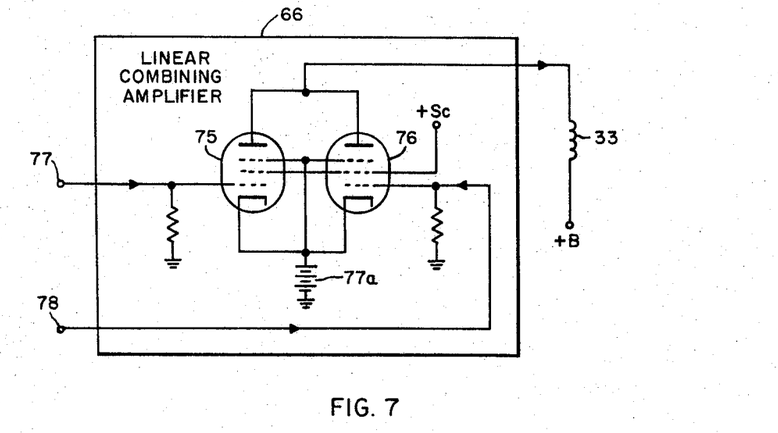
FIG. 7 is a detailed circuit diagram of a combining amplifier suitable for use in the apparatus of FIG. 6.

A linear combining amplifier suitable for use as the unit 66 of FIG. 6 is shown in FIG. 7 comprising a pair of similar pentode amplifier tubes 75, 76 suitably biased as by a cathode-bias source 77a so that, in the absence of received pulses, neither tube is conductive. The anodes of the tubes 75, 76 are connected in common to a suitable source +B through the actuating winding 33 of the ink-jet head. Pulses from the generator 64 are applied via input terminal 77 to the tube 75 while terminating pulses from the unit 65 are applied via terminal 78 to the tube 76. With this arrangement, whenever a pulse is applied to either of the terminals 77, 78, its associated tube 75, 76 becomes conductive and transmits a current pulse to the winding 33. Further, since each tube is normally rendered nonconductive except when it receives a pulse on its own control grid, a pulse on the grid of either tube produces no effect on the other tube of the pair so that there is no interaction between the two input circuits and the device represents a linear combining amplifier.

Figure 8:
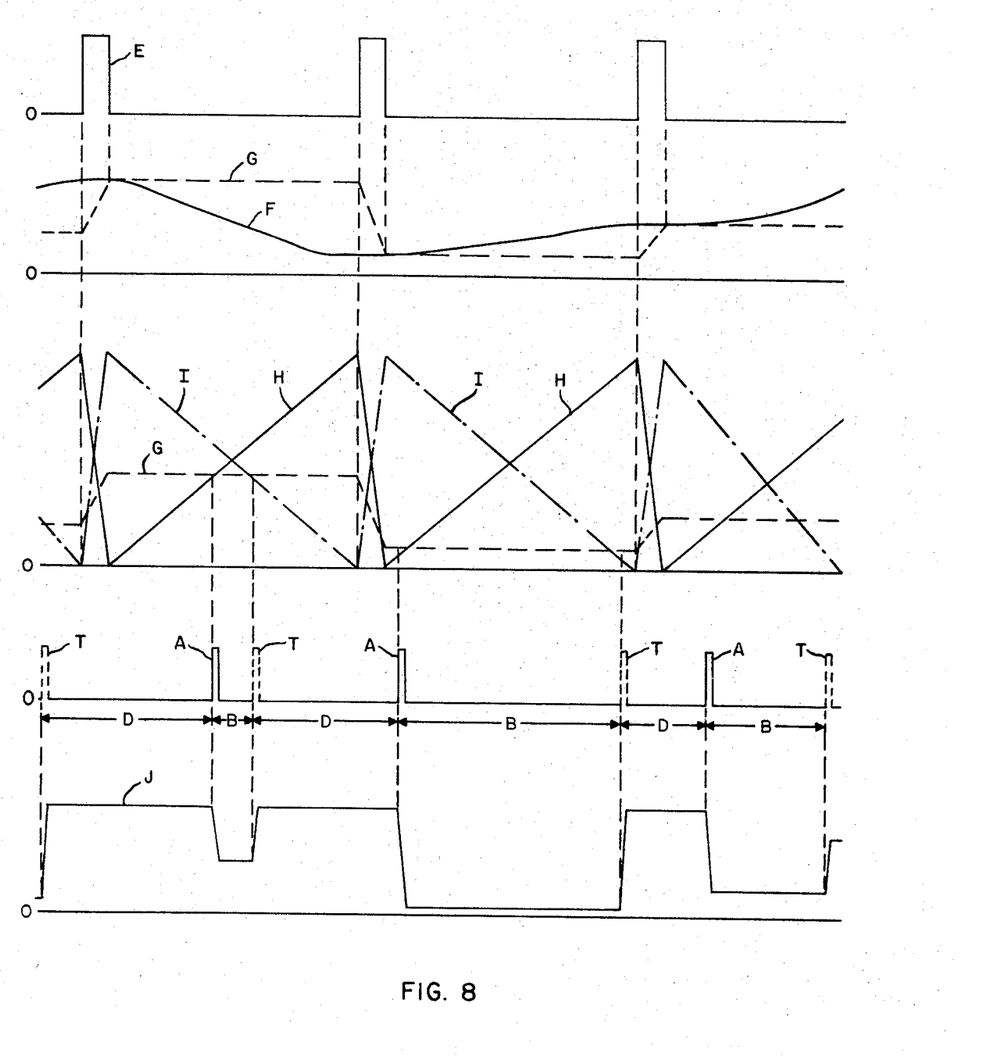
FIG. 8 comprises a series of wave forms illustrating certain operating characteristics of the system of FIG. 6.

Referring now to FIG. 8, there is represented a group of idealized wave forms representing operation of the apparatus of FIG. 6. In this figure, curve E represents the output pulse of timing generator 51 applied to the sampling circuit 52 while curve F represents the video input signal from the unit 50. The unit 52 develops an output voltage pulse which it applies to the capacitor only during the coincidence of the waves E and F and changes the charge on capacitor 53 in either sense, depending upon the magnitudes of the successive video signal samples. For clarity of illustration, the time scale is, of course, greatly magnified. The resultant voltage appearing across capacitor 53 is represented by curve G, the changes in potential across such capacitor being shown during each sampling pulse E and such potential being maintained substantially constant until the occurrence of the succeeding sampling pulse. A voltage of like wave form is obviously repeated across the cathode-load resistor 55. The changes in potential across the capacitor 53 during each sampling interval will, of course, be exponential in character but have been shown linear merely for simplicity.

In FIG. 8, solid-line curve H represents the sawtooth voltage wave output of the "positive" generator 56 while the dash-line curve I represents that developed by the "negative" generator 57. Whenever the value of curve H equals that of curve G, the diode 58 becomes conductive and current commences to flow therein, generating an anticipating pulse A via transformer 60 which is applied to anticipating pulse generator 64, which may be in the form of a monostable multivibrator serving essentially to amplify and shape up the pulses from the transformer 60. Similarly, when the instantaneous value of the potential output of the "negative" generator 57 falls to a value substantially equal to that of the video sample G, a terminating pulse T is generated via diode 61, transformer 63, and generator 65. The resultant wave, comprising the pulses A and T of FIG. 8, corresponds generally to the resultant pulses R of FIG. 5 and this is developed in the linear combining amplifier 66 from which it is applied to the actuating winding 33 to develop desired ink droplets during the intervals B to be directed to the record sheet 12 and undesired ink droplets during the intervals D to be directed to the drain 41, as explained in connection with FIG. 5.

At the same time, the sampled video signal represented by curve G is applied via nonlinear amplifier 70 to the sampling circuit 71 the output of which is connected in parallel with the output of the sampling circuit 67 and applied to the holding capacitor 72 which develops a potential represented by curve J. During the intervals D, the relatively high potential of capacitor 72 developed from the source 68 via sampling circuit 67 is applied to cylinder 35 via delay device 69 to deflect the undesired droplets to the drain and, during the intervals B when the desired ink droplets are directed to the record sheet 12, the value of the potential applied to cylinder 35 via capacitor 72 is that derived from the sampled video signal G. It is noted from FIG. 8 that the potential of the charging cylinder 35 during the intervals B of the desired ink droplets varies in accordance with the value of the video signal G as modified by the action of the nonlinear amplifier 70. This variation of the potential of the charging cylinder 35 during the transit of the desired ink droplets is to compensate for the variation in transit time of the ink droplets and the varying effect of the deflection field developed by electrodes 37, 38 due to the difference in the masses of the droplets, as explained above.

Thus, in the operation of the system of FIG. 6, the duration and, therefore, the size of the desired ink droplets developed during the intervals B are controlled by the timing of the anticipation pulses A and terminating pulses T which, in turn, is controlled by the instantaneous amplitude of the sampled video signal. At the same time, during the intervals D corresponding to the undesired droplets, these droplets comprise the difference between the discharge of the nozzle 26 during an average cycle and that constituting the desired droplets during the intervals B. During these intervals D, the high-potential portions of the rectangular wave output of sampling circuit 67 are applied via delay device 69 to the charging cylinder 35 to deflect the undesired droplets to the drain 41. Sampling circuit 71 is controlled by anticipating pulses A from generator 64 and sampling circuit 67 is controlled by terminating pulses T from generator 65 so that the deflection of the ink droplets occurs in phase with the actual droplet formations but appropriately delayed with respect thereto.

The amplitudes of the sawtooth waves H and I (FIG. 8) are adjusted by voltage-dividers 59 and 62, respectively, in accordance with the amplitude of the input video signal. Preferably, the amplitudes of these two waves are so adjusted that, with the video amplitude corresponding to white in the subject copy, the timing of the anticipatory pulses A and the terminating pulses T is such that the desired droplets B do not result in an ink deposit which exceeds the minimum acceptable average density for white in the reproduced copy.

In an alternate form of the invention, instead of varying the time intervals between the anticipatory pulses A and terminating pulses T, and thus the relative duration and size of each desired droplet, there is supplied by the nozzle 26 a stream of ink comprising portions sequentially of different optical characteristics, for example of maximum optical density such as black and clear or substantially zero optical density, the durations and sizes of all desired droplets are made substantially constant, and the instantaneous timing of the initiation of each of the desired droplets is continually adjusted relative to the phase of the variations of the ink components to control the timing or phase of each desired droplet, and thus the relative amount of high-density and low-density ink in each droplet, to control the tone value of each desired droplet.

Figure 9:
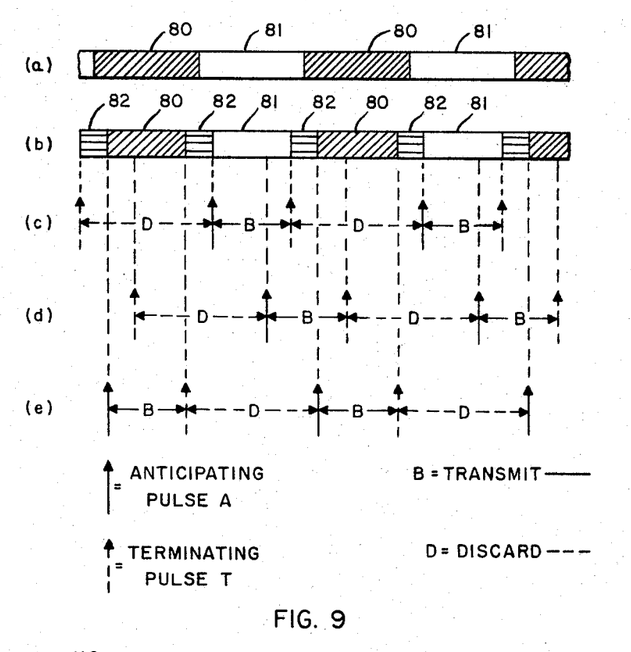
FIG. 9 is a chart to aid in the explanation of another embodiment of the invention.

For example, referring to FIG. 9, in line (a) there is represented a stream of ink having substantially black portions 80 and clear portions 81. This represents an ideal situation which is difficult to realize in practice. In line (b) there is represented a more practical ink composition in which the black portions 80 and clear portions 81 are separated by intervening portions 82 representing a transition mixture of the black and clear portions. If, now, anticipating pulses A and terminating pulses T, as represented by the solid-line and dotted-line arrows respectively, are applied to the nozzle supplying the ink represented in line (b), the durations B of the desired droplets and the durations D of the undesired droplets will be as represented in line (c). Under this condition, it will be seen that the desired droplets during the intervals B comprise only clear ink portions 81 corresponding to white in the reproduced image. In line (d), the anticipation pulses A and the terminating pulses T have been delayed collectively by equal time intervals so that, under these conditions, the desired droplets during the intervals B are made up of substantially equal parts of the clear ink portions 81 and the black ink portions 80 as well as a mixed portion 82 so that the resultant desired ink droplet would be about midway in the neutral grey tone scale. Again, if the anticipation puses A and terminating pulses T are collectively still further delayed in time, as represented by line (e), it will be seen that the desired droplets occurring during the intervals B consist substantially wholly of black ink so that the desired droplet directed to the record sheet 12 will produce an elemental black area. It is to be noted that the durations of the desired droplets B do not exceed the clear portions 81 or the black ink portions 80 so that it is possible to deposit wholly clear or wholly black ink droplets regardless of mixing during transition in the ink stream.

Figure 10:
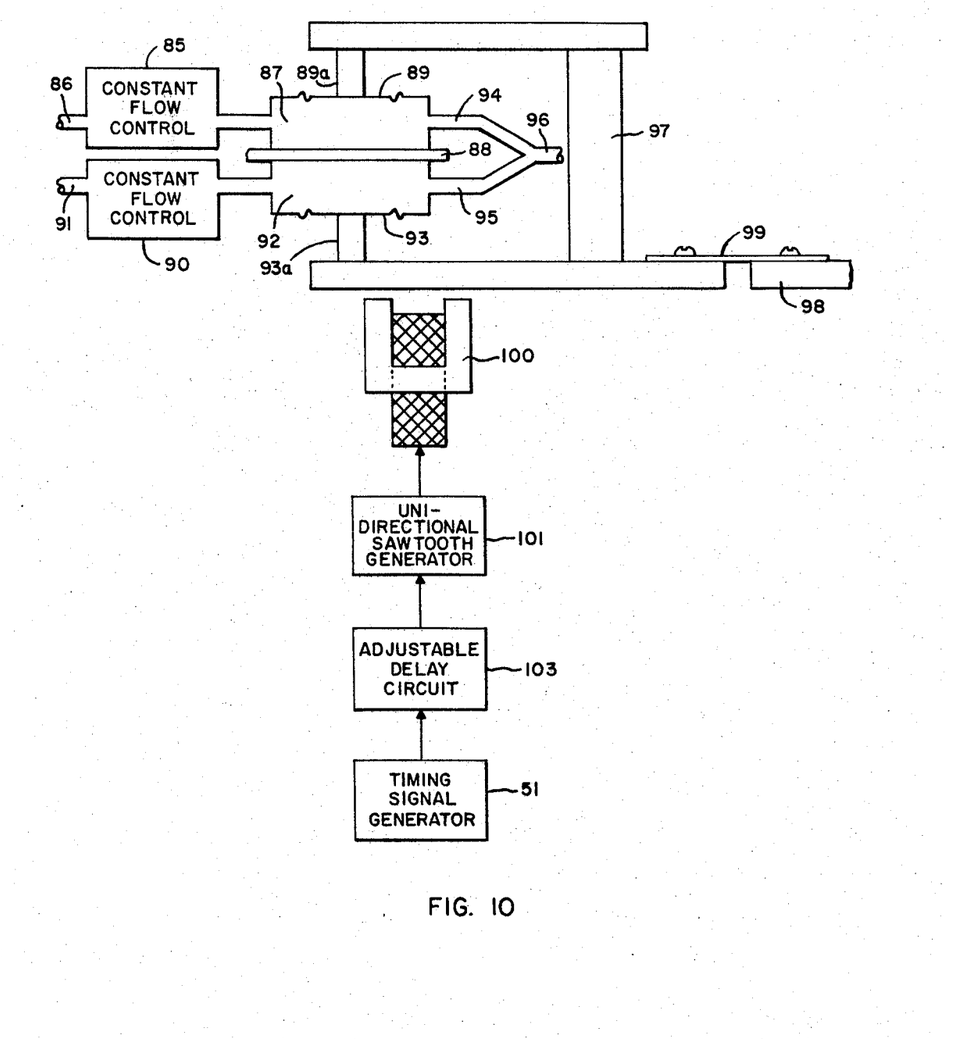
FIG. 10 is a schematic representation of apparatus for providing a variable-density ink for use in the modified form of the invention.

An apparatus for producing an ink stream as represented by line (b) of FIG. 9 is shown schematically in FIG. 10. This apparatus comprises a constant-flow control unit 85 for establishing a constant flow of an ink component of one optical density, for example black ink, from an inlet pipe 86 and delivering it to a chamber 87 the lower wall of which is formed by a frame member 88 and the upper wall by an expansible diaphragm 89. Similarly, a constant-flow control unit 90 is connected to establish a constant flow of ink of a different optical density, for example clear fluid, from an inlet 91 and delivering it to a chamber 92 having the frame member 88 as one wall thereof and an expansible diaphragm 93 as the other wall. Outlets 94 and 95 of the chambers 87, 92 respectively, join to form a common outlet 96 suitable for connection to the link 32 (FIG. 4).

The apparatus of FIG. 10 further comprises means for delivering to the outlet 96 alternate like quantities of ink from the inlets 86 and 91. This means comprises a yoke 97 supported from a frame member 98 by way of a spring hinge 99. Yoke 97 actuates the diaphragms 89, 93 by way of rigid connecting posts 89a, 93a, respectively. A portion of the yoke member 97 forms the armature of an electromagnet 100 excited from a polarized or unidirectional sawtooth generator 101 which is timed or triggered from the timing signal generator 51. With the use of such a unidirectional generator 51, the spring hinge 99 is designed to provide an average restoring force sufficient to keep the yoke 97 from being attracted closer to the magnet then a desired average position. An adjustable delay circuit 103 may be interposed between the generator 51 and the sawtooth generator 101 to adjust the phase of the alternations of the two ink components in the outlet 96 for calibration purposes.

The sawtooth generator 101 is of the type designed to have equal trace and retrace intervals and is thus effective to reciprocate the yoke 97 and the connected diaphragms 89 and 93 at the frequency of the timing signal generator and at equal upward and downward velocities, as viewed in FIG. 10. The apparatus comprising the electromagnet 100, the yoke 97 and the movable elements attached thereto should have a substantially uniform response over the band of frequencies represented in the sawtooth wave from generator 101; that is, any resonant frequency of the system described should fall outside such frequency band.

The terminating pulses T are delayed with respect to the anticipating pulses A by a fixed amount equal to one-half the time interval between successive samplings of circuit 52, diminished by an allowance for the presence of sections of flow containing mixed ink as shown at 82 in FIG. 9. In practice, this time interval will be between 0.25 and 0.40 times the interval between successive samplings.

The capacities of the chambers 87, 92 are so proportioned in relation to the constant flow of inks through the inlets 86, 91, respectively, and the desired rate of flow through the outlet 96 and through the nozzle 26 that, for example, during upward movement of the yoke 97, the increase in volume of the chamber 87 is exactly equal to the volumetric flow from the inlet 86 that there is no flow through the outlet 94, while the flow through the outlet 95 will be at precisely twice the rate of the flow through the inlet 91. During downward movement of the yoke 97, obviously the reverse holds true. Consequently, the ink delivered from the outlet 96 will be as represented in line (b) of FIG. 9, allowing for the slight mixing of the two ink fluids during the transition from ink from the inlet 86 to that from the inlet 91. To minimize mixing, the length of the fluid outlet 96 should be as short as possible.

Figure 11:
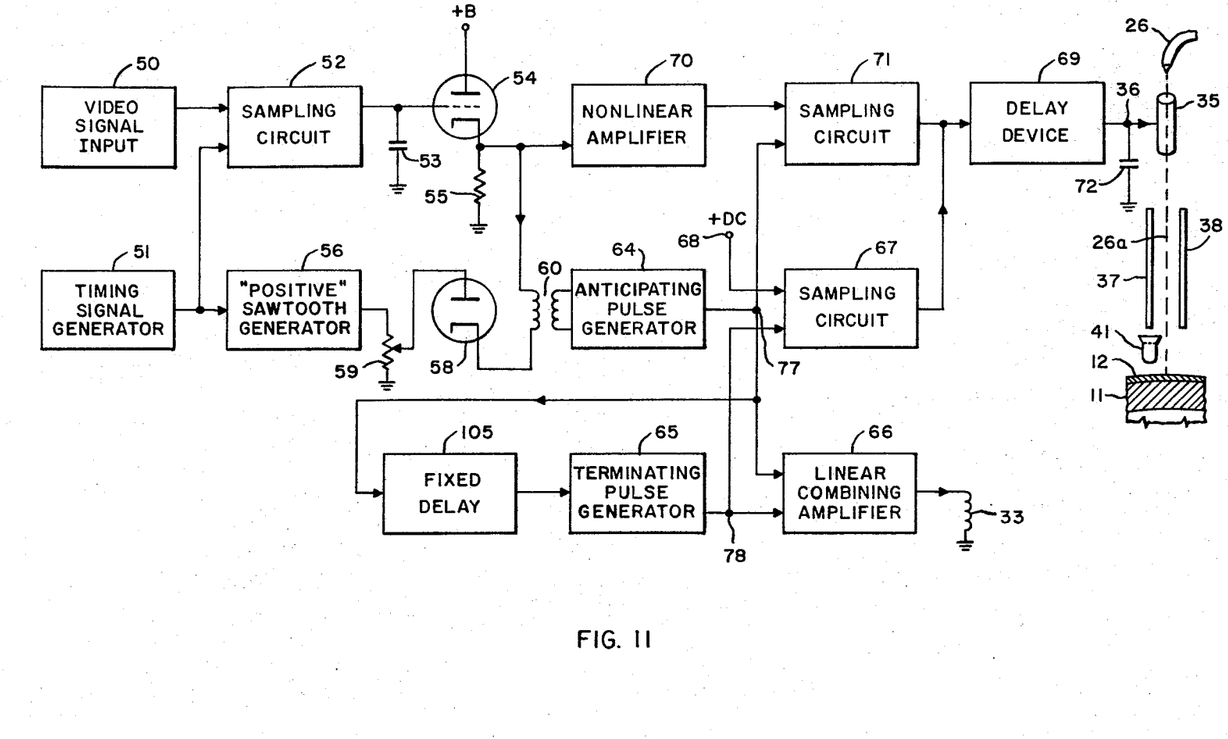
FIG. 11 is a schematic functional diagram of a complete electrical system for controlling the ink-jet copy-reproducing apparatus of FIG. 1 embodying a modified form of the invention.

Referring now to FIG. 11, there is represented schematically a complete electrical system for controlling the ink-jet apparatus of FIGS. 1–4, inclusive, in accordance with the principles just discussed in connection with FIGS. 9 and 10. The electrical system of FIG. 11 is, to a large extent, a duplicate of that of FIG. 6 and corresponding elements are identified by the same reference numerals. However, in the system of FIG. 11, the negative sawtooth generator and its associated diode and current transformer are eliminated and there is provided means for deriving from the anticipating pulses A secondary terminating pulses T delayed with respect thereto by an interval equal to the duration of the desired droplet B. Specifically, the terminating pulse generator is triggered by supplying anticipating pulses from the generator 64 through a fixed delay circuit 105 having a delay exactly equal to a predetermined fraction of the period of oscillation of the nozzle 26 so that, in this case, the durations B of the desired droplets are constant and, similarly, the average durations D of the discard droplets are constant but the duration B of the desired droplet is considerably shorter than the average duration D of the discard droplet, as shown in FIG. 9. The fixed delay unit 105 will consequently have a delay equal to the duration B of the desired droplets.

The operation of the system of FIGS. 11 is otherwise similar to that of FIG. 6 described above. However, the characteristic of the nonlinear amplifier 70 will no longer be required to take into account variations in the transit times of the desired droplets due to their variation in size since, in this form of the invention, they will be of constant size. Therefore, the nonlinear characteristic of the amplifier 70 will be determined to compensate for variations in the timing of the initiation of the desired droplets which, in turn, vary with the amplitude of the video signal samples.

Figure 12:
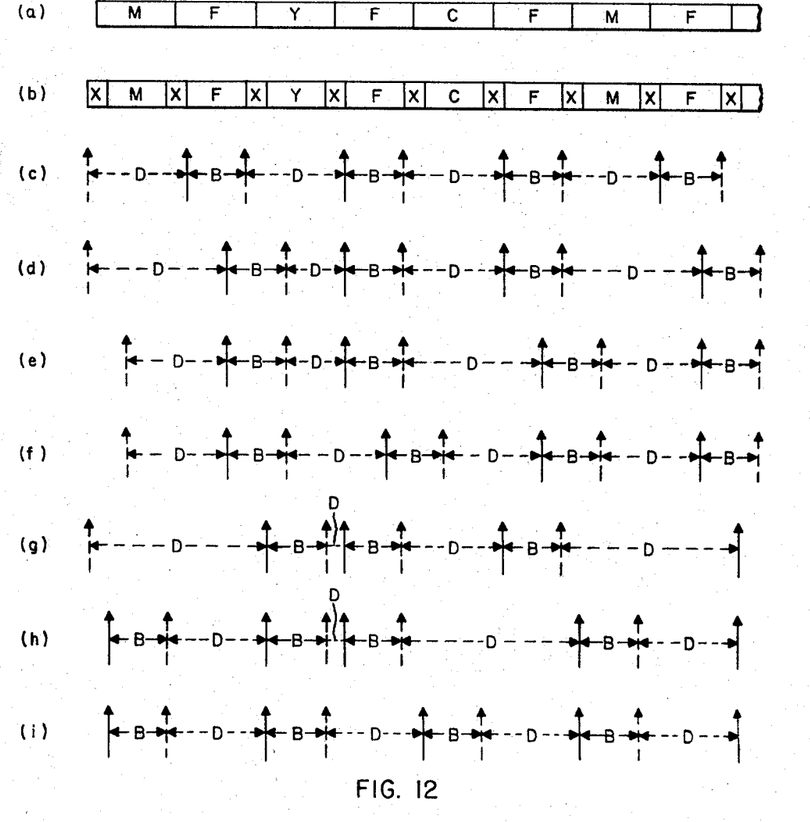
FIG. 12 is a chart to aid in the explanation of the apparatus of FIG. 11.

The apparatus represented in FIG. 11 can further be modified to reproduce multicolor copy. Referring to FIG. 12, line (a) represents the composition of an ink stream comprising magenta (M), yellow (Y), and cyan (C) ink components, each component being separated by a clear fluid component (F). Since it is not practicable to change over from one color to another instantaneously, a practical representation is shown in line (b) in which the blocks X represent the portions of the ink stream comprising mixtures of the various color inks with the clear fluid components. If such an ink stream now is applied to the nozzle 26 and that nozzle is excited by anticipating pulses represented by the solid-line arrows and terminating pulses represented by the dotted-line arrows in line (C), then, by appropriate shifting of the timing of these pulses, there result desired droplets formed during the time intervals B and discard droplets formed during the time intervals D.

In line (c) of FIG. 12, the relationship is such that all of the desired droplets B are of clear fluid, representing white in the reproduced copy. In line (d), the desired droplet B during the first interval B has been advanced so that it includes approximately one-half of the yellow ink component, the other desired droplet intervals B remaining the same, so that the resultant deposit on the record sheet 12 would be a rather unsaturated yellow. In line (e), the third desired droplet interval has been advanced to supply a substantial portion of the magenta component which, combining with the yellow component developed during the first interval B, results in a half-strength red. In line (f), the exciting pulses have been shifted so that each of the desired pulse intervals B selects approximately one-half of one of the color components, resulting in what might be called a half-strength neutral grey. The following lines (g), (h), and (i) show the timing of the anticipation and terminating pulses so that the desired pulse intervals B coincide with full yellow, full red, and full black respectively. It will be noted that in each of the conditions just described, the duration of the intervals B of the desired droplets remains constant, preferably not exceeding the durations of the unmixed M, Y, and C ink portions so that it is possible to obtain ink droplets of undiluted colored ink of any color. The durations D of the discard droplets, while varying from instant-to-instant, have an average constant duration and period.

Figure 13:
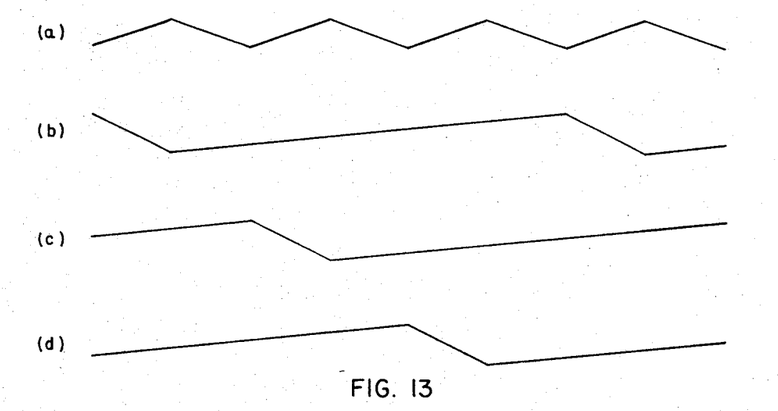
FIG. 13 comprises a group of wave forms required for practicing the modified form of the invention.

Referring now to FIG. 13, there are represented the variations in the volumetric requirements of the magenta, yellow, and cyan inks and clear fluid chambers which, in conjunction with the assumed constant rates of inflow, produce a composite ink stream as represented in line (b) of FIG. 12. In FIG. 13, curve (a) represents the variation in volumetric requirement of the clear fluid F with time; curve (b) may represent the variation in volumetric requirement of the magenta ink with time, it being noted that this variation has a frequency one-third that of the clear fluid variation of curve (a); while curves (c) and (d) represent the corresponding volumetric requirements of the yellow and cyan ink components, these being similar to the requirement of curve (b) except that they are successively displaced in phase by one period of the clear fluid variation of curve (a). In each of the curves of FIG. 13, the upward slope represents the movement of the diaphragm in such a sense as to expand the volume of the chamber and the downward slope represents movement to contract the chamber volume. The upward slope, in each case, represents the volume increase with time which is just required to adsorb in the chamber the full constant fluid input to the chamber. The downward slope is at such a rate as to expel, during the discharge period, all of the fluid accumulation during the preceding expansion interval plus the continued constant fluid input. Since, as shown in FIG. 12(b), there are three intervals of clear fluid for each of the portions of a color ink component, the frequency of the curve of FIG 13(a) is three times that of the other curves.

Figure 14:
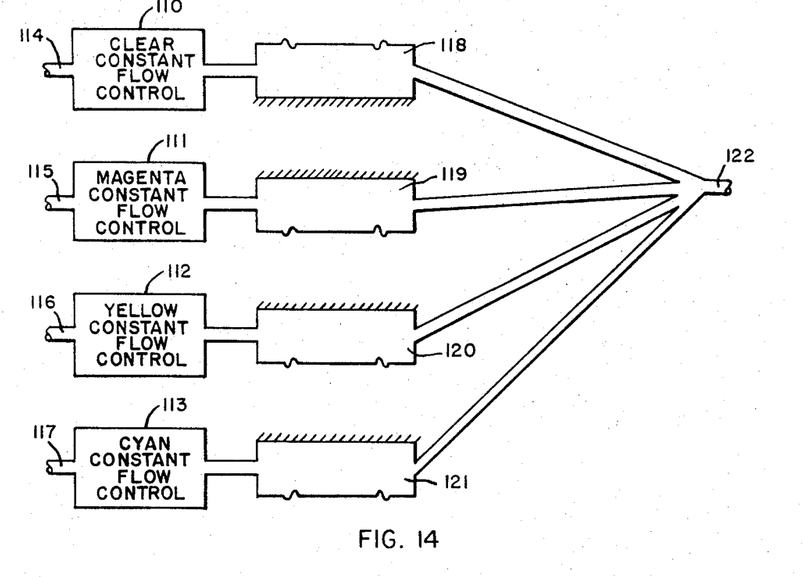
FIG. 14 is a schematic representation of an ink-distributing apparatus for providing ink of variable density and variable chromaticity.

An apparatus for developing an ink stream as represented by FIG. 12(b), in accordance with the principles represented in FIG. 13, is shown schematically in FIG. 14. This apparatus comprises constant-fluid flow units 110, 111, 112, and 113 for fluid inlets 114, 115, 116 and 117 respectively, supplying clear fluid, magenta, yellow, and cyan inks. The units 110–113, inclusive, supply constant-fluid flow to the chambers 118–121, respectively, each having a fixed wall and an expansible diaphragm wall, as illustrated, and driven by apparatus described hereinfter. The outlets from the chambers 118–121, inclusive, join in a common outlet 122 which may be connected to the ink line 32 of the apparatus of FIG. 4.

Figure 15:
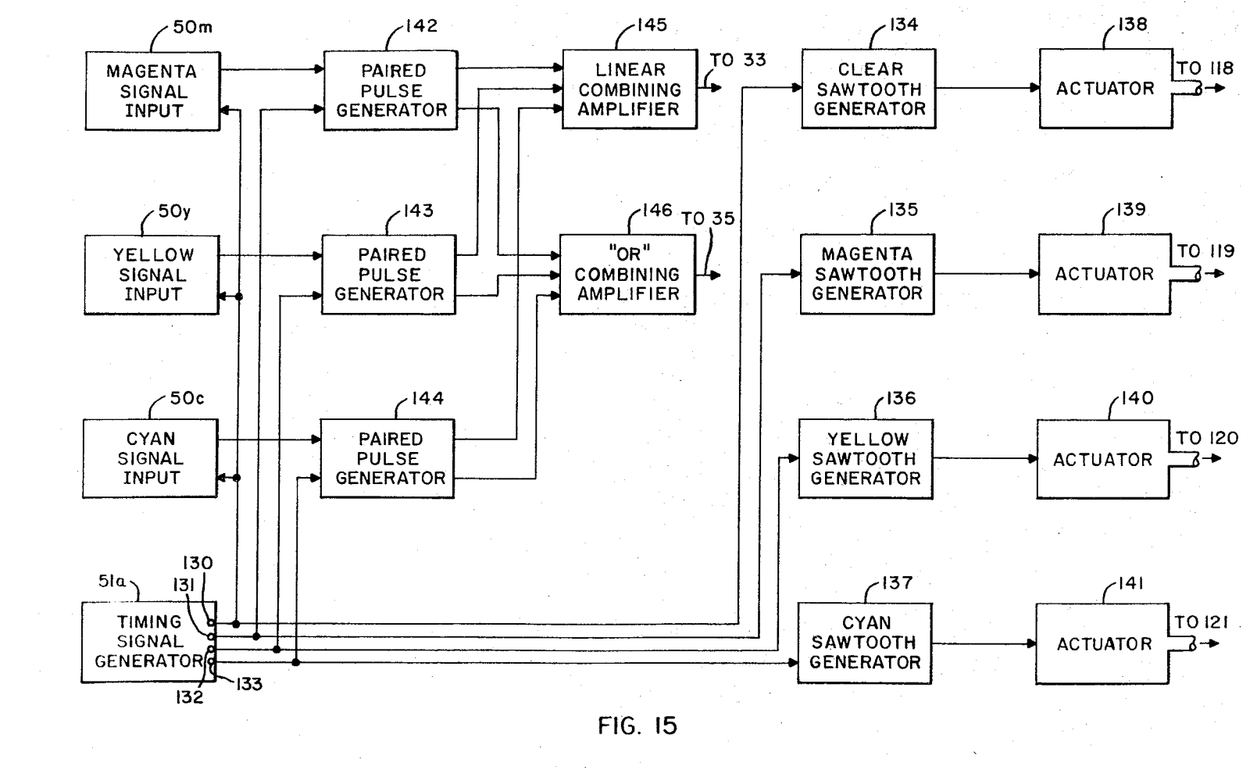

Referring now to FIG. 15, there is represented in block form, a complete electrical system for controlling the ink jet of FIGS. 1–4, inclusive, in accordance with the principles described in connection with FIGS. 12 and 13. The system includes a timing signal generator 51a which differs from the corresponding unit of FIG. 11 in that it provides, at an output terminal 130, a timing signal of the frequency of the sampling signals and, at its output terminals 131, 132, and 133, three pulse signals of one-third the frequency of the sampling signal and with a time delay from each of these three pulse signals to the next equal to one period of the signal at the terminal 130. The timing signals from the terminals 130–133, inclusive, are applied to clear, magenta, yellow, and cyan sawtooth generators 134–137, respectively, which are effective to develop sawtooth waves represented by curves (a)–(d), inclusive, of FIG. 13. These sawtooth waves are applied to actuators 138–141, respectively, each of which may be of the type illustrated in FIG. 10 and connected to the diaphragms of the chambers 118–121, respectively, of FIG. 14, thereby to develop, under the control of the timing signal generator 51a, an ink stream having the characteristics represented in FIG. 12, line (b).

The timing signals from terminals 131, 132, and 133 of generator 51a are also applied to three adjustable-phase paired pulse generators 142, 143, and 144, respectively, which also receive video signals from the magenta, yellow, and cyan signal input units $50_m$, $50_y$, and $50_c$, respectively. Each of the paired pulse generators 142, 143, 144 includes an assembly of elements for its respective color corresponding to the following elements of the system of FIG. 11: a sampling circuit 52, a holding capacitor 53, a cathode-follower 54, and, if desired, a nonlinear amplifier 70, a high-potential source 68, the sampling circuits 67 and 71, and the delay device 69. For clarity, these several elements are not repeated and duplicated for each color in the system of FIG. 15. As in the system of FIG. 11, each of these paired pulse generator assemblies, in response to the amplitude of the video signal applied thereto, develops a pair of anticipation pulses A and terminating pulses T approximately timed so as to develop desired droplets during the intervals B (FIG. 12) of only full-strength ink of a desired color or in any desired intermediate concentration of ink of a single color or plural colors. The outputs of the paired pulse generators are applied to a linear combining amplifier 145 which may be of the type illustrated in FIG. 7 with an additional parallel-connected pentode tube. The output of the amplifier 145 is appropriate for application to the exciting winding 33 of the ink-jet head to produce the initiation and termination of the successive droplets, in accordance with the patterns shown in FIG. 12.

Figure 16:
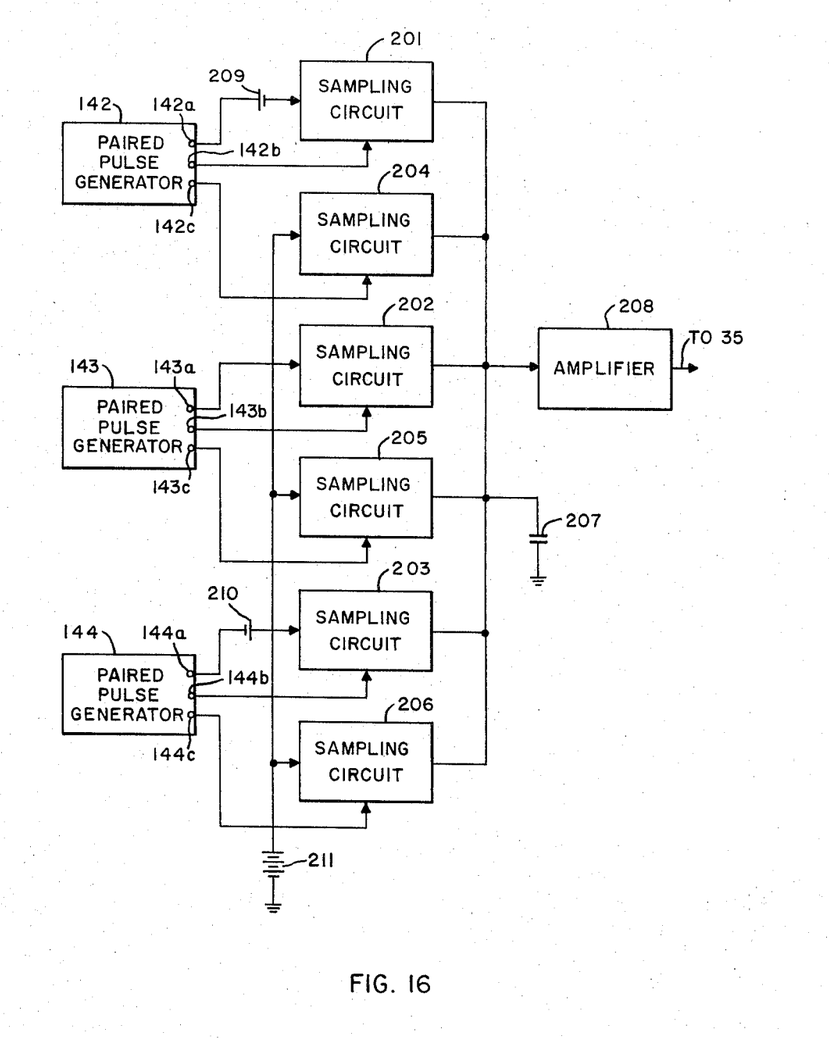
FIG. 16 is a schematic representation of an OR amplifier unit of FIG. 15.

The paired pulse generators 142, 143, and 144 also supply control potentials to an "OR" combining amplifier 146 the output of which is connected to the droplet charging cylinder 35. An "OR" amplifier suitable for use as the unit 146 is illustrated in FIG. 16. In FIG. 16 are shown the paired pulse generators 142, 143, and 144 of FIG. 15, each having three independent outputs identified by the suffixes a, b, and c. The a output of each of the generators 142, 143, 144 corresponds to the sampled video output of amplifier 70 of the circuit of FIG. 11. The b output of each generator corresponds to the output of anticipating pulse generator 64 of FIG. 11, while output c of each generator corresponds to the output of terminating pulse generator 65 of FIG. 11. The circuit of FIG. 16 also includes six sampling circuits 201–206, each of which may be similar to the sampling unit 52 of FIGS. 6 and 11. The output terminals of the sampling circuits 201–206 are connected in common to a storage capacitor 207 and to the input of an amplifier 208. The output of amplifier 208 is connected to the droplet charging electrode 35.

Sampling circuits 201, 202, and 203 receive the sampled video signals from the output terminals 142a, 143a, and 144a, respectively, and also receive anticipating pulses A from output terminals 142b, 143b, and 144b, respectively. Sampling circuits 204, 205, and 206 receive terminating pulses T from output terminals 142c, 143c, and 144, respectively, while a substantial DC voltage from a suitable source, indicated by a battery 211, is also applied to each of these sampling circuits. For a purpose to be described, a small DC offset voltage from a source 209 may be included in the connection from terminal 142a to sampling circuit 201 and a similar voltage of opposite polarity is included in the connection from terminal 144a to sampling circuit 203.

The operation of the circuit of FIG. 16 is such that, upon the occurrence of an anticipating pulse A at the output 142b, the sampled video signal from output 142a is passed by circuit 201 and caused to appear as a potential on capacitor 207 and as an input to amplifier 208. The output of amplifier 208, applied to electrode 35, produces the charge on the droplet which directs it to the target with such compensation for early or late drop arrival at the record sheet 12 as may have been selected in the design of amplifier 70. The occurrence of a terminating pulse T from output 142c causes the replacement of a target directing potential on capacitor 207 by a drain directing potential derived from source 211 and the consequent direction of the succeeding droplet to the drain 41. Correspondingly, operation takes place for the other two colors as their respective anticipating and terminating pulses are generated and applied to their respective sampling circuits.

Coming now to the offset voltage from source 209, this will result in all sampled video potentials from output 142a applied to the sampling circuit 201 being slightly changed in a sense to bodily move the entire magenta image slightly to the right or the left, depending on the polarity of voltage from 209. Similarly, the voltage from source 210 will have the effect of bodily moving the entire cyan image slightly to the left or to the right. By proper adjustment of these two voltages, any small misregistry of one image with respect to another, which otherwise would result in color fringing, may be substantially eliminated.

Thus, in the system of FIG. 15, there are supplied to the system input signals representative of the magenta, yellow, and cyan components. The paired pulse generators 142, 143, and 144 are effective to derive therefrom anticipation pulses A and terminating pulses T representative of the chromaticities of the three input signals in sequence and of supplying them to the actuating winding 33 of the nozzle 26 and in which there is supplied to the nozzle a fluid stream comprising portions of different predetermined chromaticities corresponding to the input signals from the units $50_m$, $50_y$, and $50_c$ in a predetermined sequence with intervening portions of substantially clear fluid, that is, of substantially zero optical density, separating adjacent ones of the chromatic portions of the ink stream. With this arrangement, the reproduced copy on the record sheet 12 substantially duplicates the chromaticity and luminance of the subject copy to be reproduced.

Alternatively, multicolor copy can be produced in accordance with the invention by utilizing a plurality of ink jets on the ink-jet head, one for each color, as described in applicant's aforesaid copending application, and controlling each of such ink jets by apparatus of the character shown in FIG. 6 or FIG. 11.

While there have been described what are, at present, considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. In a controlled ink-jet apparatus for reproducing a subject copy on a record sheet including input means for supplying at least one synchronized video signal representative of the serial information content of a subject copy to be reproduced and a head for scanning a record sheet in synchronism with said video signal, controllable ink-jet apparatus adapted for mounting on said scanning head comprising:
   an ink-jet nozzle;
   means for acting upon a jet from said nozzle to break it up into droplets at a substantially constant average frequency;
   means for periodically sampling the input video signal in synchronism with the average frequency of said acting means;
   and means responsive to the magnitude of each signal sample for controlling the instantaneous timing of said acting means to determine the initation of a succeeding droplet.

2. A controllable ink-jet apparatus in accordance with claim 1 in which the means for controlling the timing of said acting means includes a sawtooth potential generator operating in synchronism with said sampling means and means for comparing the instantaneous potential of said generator and the output potential of said sampling means and initiating a succeeding droplet when the potentials have substantially the same values.

3. A controllable ink-jet apparatus in accordance with claim 2 in which said comparing means comprises a unidirectionally conductive device interconnecting the outputs of said generator and said sampling means and a pulse-generating device connected in series with said unidirectionally conductive device and effective to generate a pulse when said two potentials have substantially the same values.

4. A controllable ink-jet apparatus in accordance with claim 1 which includes an electromechanical actuator for the ink-jet nozzle and in which the means for determining the initiation of each droplet includes means for developing a pulse of electric energy and applying it to said actuator.

5. A controllable ink-jet apparatus in accordance with claim 1 which includes an electromagnetic actuator for the ink-jet nozzle and in which the means for determining the initiation of each droplet includes means for developing a current pulse and applying it to said actuator.

6. A controllable ink-jet apparatus in accordance with claim 1 which includes means for developing an electric field encompassing the trajectory of the ink jet and means responsive to the sampled video signal for exciting said electric field means.

7. A controllable ink-jet apparatus in accordance with claim 6 which includes a drain for said ink-jet nozzle and means for directing alternate ink droplets to said drain.

8. A controllable ink-jet apparatus in accordance with claim 6 in which said electric field exciting means includes a nonlinear amplifier proportioned to compensate for variations of the transit of the ink droplets from said nozzle to the record sheet.

9. A controllable ink-jet apparatus in accordance with claim 1 which includes a drain for said ink-jet nozzle, means for developing an electric field encompassing the trajectory of the ink jet, and a sampling circuit actuated at the same frequency as said sampling means for directing alternate ink droplets to said drain.

10. Controllable ink-jet apparatus in accordance with claim 1 in which the means responsive to the sampled signal controls both the instantaneous timing of the initiation and the duration of a succeeding ink droplet.

11. A controllable ink-jet apparatus in accordance with claim 10 in which the means for controlling the timing of said acting means includes a pair of generators for developing sawtooth potentials of opposite polarities, means for comparing the instantaneous potential of one of said generators and the output potential of said sampling means and initiating a succeeding droplet when the potentials have substantially the same values, and means for comparing the instantaneous potential of the other of said generators and the output potential of said sampling means and terminating said droplet when the potentials have substantially the same values.

12. A controllable ink-jet apparatus in accordance with claim 11 which includes a drain for said ink-jet nozzle and means for directing ink droplets following said succeeding droplet to said drain.

13. A controllable ink-jet apparatus in accordance with claim 11 in which each of said comparing means includes means for generating a pulses when its respective two potentials have substantially the same values, and a combining amplifier coupled to said pulse-generating means and having an output circuit coupled to said acting means.

14. Controllable ink-jet apparatus in accordance with claim 1 which includes means for supplying to said nozzle a fluid stream having portions sequentially of different optical characteristics and in which the means responsive to the sampled signal controls the instantaneous timing of the initiation of a suceeding ink droplet of substantially constant duration.

15. A controllable ink-jet apparatus in accordance with claim 14 in which the fluid stream supplied to said nozzle comprises portions alternately of predetermined optical density and of substantially zero optical density, whereby the density of each elemental area of the reproduced copy varies with the timing of the ink droplet forming the same.

16. A controllable ink-jet apparatus in accordance with claim 14 in which the input signal represents video components of predetermined chromaticities in a predetermined sequence and in which the fluid stream supplied to said nozzle comprises portions of different predetermined chromaticities in a predetermined sequence with portions of substantially zero optical density separating adjacent ones of said chromatic portions, whereby the reproduced copy substantially duplicates the chromaticity and luminance of the subject copy.

17. A controllable ink-jet apparatus in accordance with claim 14 in which the means for controlling the timing means includes a generator for developing a sawtooth potential, means for comparing the instantaneous potential of said generator and the output potential of said sampling means, means for generating a first pulse when said two potentials have substantially the same values, means for deriving from said first pulse a second pulse delayed with respect thereto by an interval equal to the duration of the desired droplet, and means for utilizing said first pulse to initiate a succeeding droplet and said second pulse to terminate such droplet.

References Cited

UNITED STATES PATENTS

| | | | |
|---|---|---|---|
| 3,298,030 | 1/1967 | Lewis et al. | 346—75 |
| 3,281,859 | 10/1966 | Stone | 346—75 |
| 3,404,221 | 10/1968 | Loughren | 178—6.6 |

ROBERT L. GRIFFIN, Primary Examiner

D. E. STOUT, Assistant Examiner

U.S. Cl. X.R.

178—5; 346—75